United States Patent
Shi et al.

(10) Patent No.: US 11,157,695 B1
(45) Date of Patent: Oct. 26, 2021

(54) SYSTEMS AND METHODS FOR SELECTING EFFECTIVE PHRASES TO BE PRESENTED DURING A CONVERSATION

(71) Applicant: CRESTA INTELLIGENCE INC., San Francisco, CA (US)

(72) Inventors: Tianlin Shi, Menlo Park, CA (US); Saurabh Misra, San Francisco, CA (US); Motoki Dean Wu, Walnut Creek, CA (US)

(73) Assignee: CRESTA INTELLIGENCE INC., San Francisco, CA (US)

( * ) Notice: Subject to any disclaimer, the term of this patent is extended or adjusted under 35 U.S.C. 154(b) by 0 days.

(21) Appl. No.: 17/206,591

(22) Filed: Mar. 19, 2021

Related U.S. Application Data

(63) Continuation of application No. 16/944,651, filed on Jul. 31, 2020, now Pat. No. 10,970,485.

(51) Int. Cl.
*G06F 40/289* (2020.01)
*G10L 15/08* (2006.01)
*G06N 20/00* (2019.01)

(52) U.S. Cl.
CPC ........... *G06F 40/289* (2020.01); *G06N 20/00* (2019.01); *G10L 15/08* (2013.01)

(58) Field of Classification Search
CPC ........ G06F 40/289; G06N 20/00; G10L 15/08
See application file for complete search history.

(56) References Cited

U.S. PATENT DOCUMENTS

| | | | |
|---|---|---|---|
| 9,875,740 B1 | 1/2018 | Kumar et al. | |
| 10,586,237 B2 | 3/2020 | Coughlin et al. | |
| 10,726,847 B1 | 7/2020 | Hardage et al. | |
| 2008/0046386 A1 | 2/2008 | Pieraccinii et al. | |
| 2010/0274618 A1 | 10/2010 | Byrd et al. | |
| 2014/0301540 A1* | 10/2014 | Skiba | H04L 51/046 379/265.07 |
| 2015/0039536 A1 | 2/2015 | Cook et al. | |
| 2015/0088998 A1 | 3/2015 | Isensee et al. | |
| 2015/0170213 A1 | 6/2015 | O'Malley | |
| 2016/0006871 A1 | 1/2016 | O'Connor et al. | |
| 2017/0214779 A1 | 7/2017 | Moran et al. | |
| 2017/0244834 A1 | 8/2017 | Flores et al. | |
| 2017/0337200 A1 | 11/2017 | Teofili et al. | |
| 2018/0376002 A1* | 12/2018 | Abraham | H04M 3/5166 |
| 2020/0274970 A1* | 8/2020 | Ding | G06N 20/00 |
| 2020/0329144 A1* | 10/2020 | Morgan | G06N 3/006 |

\* cited by examiner

*Primary Examiner* — Sonia L Gay
(74) *Attorney, Agent, or Firm* — Invoke

(57) ABSTRACT

A conversation may be monitored in real time using a trained machine learning model to identify a desired outcome of a conversation and generate one or more phrases for accomplishing the desired outcome. A confidence score may also be determined for one or more phrases that indicates a likelihood that the one or more phrases may help accomplish the desired outcome of the conversation. In some examples, a confidence score may be based on whether an agent, a caller, or both responded unfavorably to a similar phrase used previously in another conversation. In other examples, a confidence score corresponding to one or more phrases may be based on whether a prior conversation in which one or more similar phrases was used resulted in the desired outcome being accomplished.

14 Claims, 6 Drawing Sheets

504 — Identify a prior conversation having a prior desired outcome similar to a desired outcome for a current conversation

508 — Determine that at least some of the one or more phrases were presented for use in the prior conversation

512 — Determine rate at which desired outcome(s) of prior conversations were completed using phrases

516 — Determine confidence score of the one or more phrases for the current conversation in proportion to rate at which desired outcome(s) were completed in prior conversations

520 — Determine similarity scores between prior phrases and corresponding phrases for current conversation

524 — Use similarity score as factor in determine confidence score for the one or more phrases for the current conversation

SYSTEMS AND METHODS FOR SELECTING EFFECTIVE PHRASES TO BE PRESENTED DURING A CONVERSATION

INCORPORATION BY REFERENCE; DISCLAIMER

The following application is hereby incorporated by reference: application Ser. No. 16/944,651 filed on Jul. 31, 2020. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to real-time analysis of conversations. In particular, the present disclosure relates to systems and methods for using machine learning models for contemporaneous analysis of a conversation and for determining the effectiveness of guidance presented during the conversation.

BACKGROUND

In a variety of contexts, customer support functions (e.g., sales, marketing, complaint resolution, informational query) may rely on any of a variety of tools to improve the quality and speed of interactions with customers. For example, agents in a call center may have paper or electronically stored scripts that may be used in phone or text conversations.

One possible drawback of these scripts, however, is that they may be inapt to the situation. Not only may the context of the conversation render a prescribed response ineffective or inappropriate, but circumstances external to the conversation may influence the effectiveness or appropriateness of a scripted response. In other words, a phrase that was previously effective may lose its effectiveness because of circumstances external to the conversation itself. It may be difficult for an agent in a customer support center to evaluate whether a response to a caller is appropriate and will likely be effective quickly enough to match a pace of conversation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 illustrates example operations for determining a confidence score of one or more phrases using data recorded in prior conversations in which the one or more phrases were previously used, in accordance with some embodiments.

DETAILED DESCRIPTION

Figure 1:
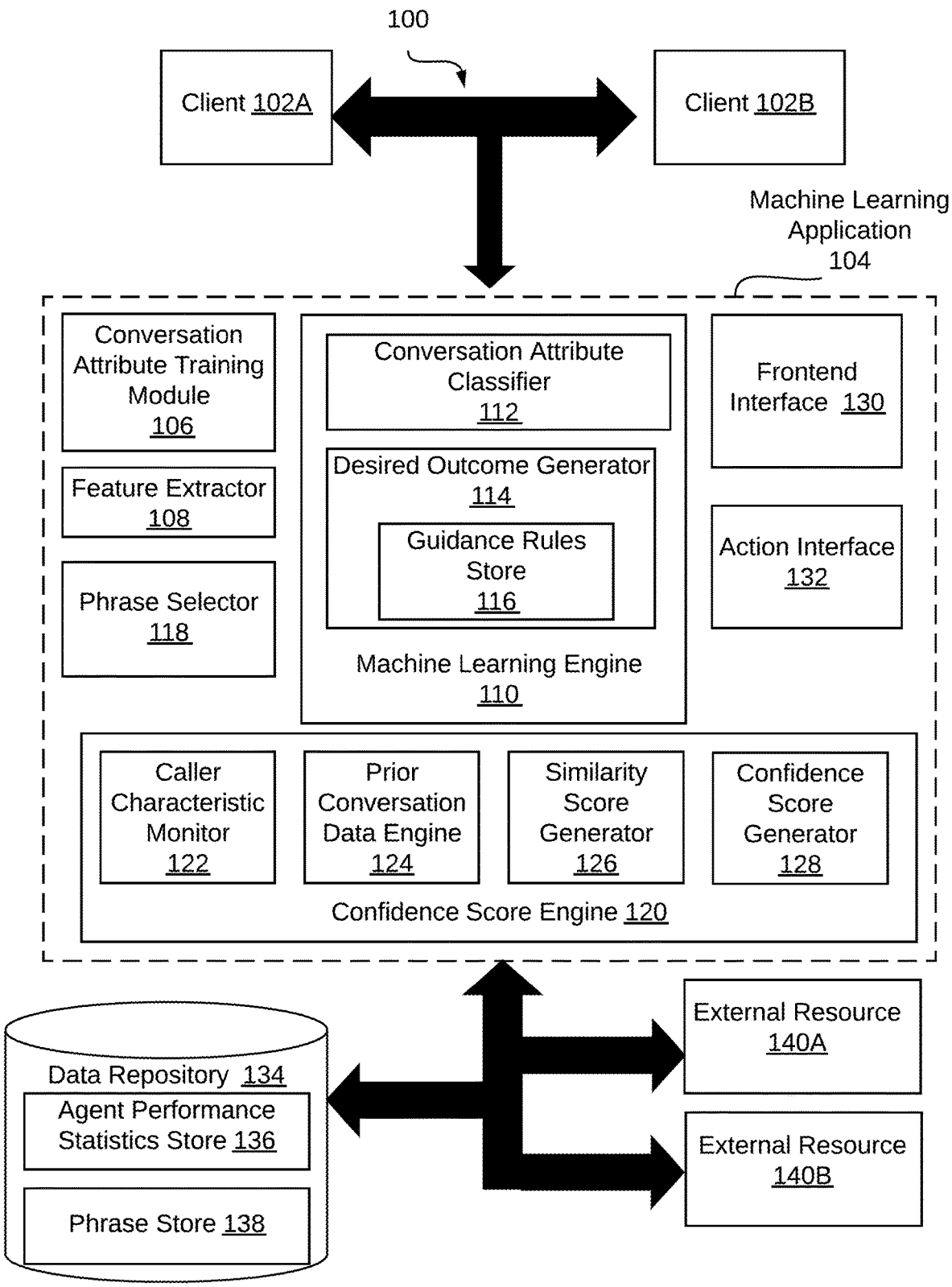
FIG. 1 illustrates a system for determining a confidence score of one or more phrases that may be used in a conversation for the purpose of accomplishing a desired outcome associated with the conversation, in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 PHRASE SELECTION
4.0 CONFIDENCE SCORE GENERATION
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS

1.0 General Overview

One challenge faced by customer support agents is promptly identifying phrases that effectively direct a conversation with a participant in the conversation (e.g., a caller, a customer engaging in a conversation via text interface, a correspondent). This difficulty is due in part to the high volume of call traffic in a customer support center, the unpredictable nature of conversation, and the voluminous scripted responses that are provided to agents as a resource. While a script resource (e.g., books, searchable databases) may be helpful in theory, in practice the ability of an agent to promptly identify an appropriate response or select between responses may be difficult. This is because a phrase may be effective when used at a particular time and/or within a particular conversational context but may not be effective when used at a different time or within a different conversation. A phrase that effectively resolves an issue at one time and/or in one conversational context may be unhelpful or counterproductive for a different caller in a different conversational context. Explaining the reasons for using a particular phrase in one context but not in another is too time consuming and difficult to be an effective training technique.

In one or more techniques of the present disclosure, a conversation may be monitored in real time so as to present one or more phrases to an agent. This real-time monitoring (equivalently referred to as "contemporaneous monitoring") of a conversation may detect attributes of a conversation using a trained machine learning (ML) model. The trained ML model may in turn be used to identify a desired outcome (or outcomes) of a conversation based on the detected attributes.

Once a desired outcome(s) of a conversation is (are) identified, techniques described below may present phrases to an agent that are likely to advance a conversation toward the desired outcome. The presented phrases may be selected based on a confidence score determined using various techniques described below. In some examples, a confidence score for one or more phrases may be based on whether an agent, a caller, or both has responded favorably or unfavorably to a similar phrase presented in an earlier conversation. In other examples, a confidence score corresponding to one or more phrases may be based on whether a desired outcome of a prior conversation was accomplished. The confidence score may be determined or scaled in proportion to a rate at which desired outcomes were accomplished in prior conversations using similar, previously presented phrases.

2.0 System Architecture

FIG. 1 illustrates a conversation analysis system 100 in accordance with one or more embodiments. In the embodiment shown, the conversation analysis system 100 includes clients 102A, 102B, a machine learning (ML) application 104, a data repository 134, and external resources 140A, 140B. In one or more embodiments, the system 100 may include more components than those illustrated in FIG. 1. The components illustrated in FIG. 1 may be local to or remote from other components used by the system 100. The components illustrated in FIG. 1 may be implemented in software and/or hardware and may be distributed over one or more applications and/or machines. Operations described with respect to the components illustrated in FIG. 1 may be instead performed by one or more other components.

In some embodiments, ML application 104 provides components through which conversations can be monitored and analyzed in real time by, for example, identifying one or more attributes of the conversation. Based on identified attributes, a desired outcome to the conversation may be identified. As indicated above, one or more phrases may be identified and presented to an agent to advance the conversation to the desired outcome. Each of the one or more phrases may be associated with a confidence score that indicates a likelihood that the associated phrase will result in the conversation accomplishing the desired outcome.

The components of the ML application 104 may include a conversation attribute training module 106, a feature extractor 108, an ML engine 110, a phrase selector 118, a confidence score engine 120, a frontend interface 130, and an action interface 132. However, as previously indicated the components of system 100, including ML application 104 may vary depending on the particular implementation.

In some embodiments, conversation attribute training module 106 receives a set of electronic documents as input (i.e., a training corpus). Examples of electronic documents include, but are not limited to, electronically stored transcriptions of conversations and/or electronically recorded conversations.

A conversation or conversation file (e.g., a transcript, a recording) used for the conversation attribute training module 106 may include labels that identify conversation attributes. These attributes may in turn be associated with interim and/or ultimate desired outcomes. The system may then use these labeled attributes to identify and/or select phrases for use by an agent in new, "target" conversations.

The conversation attribute training module 106 may be in communication with clients 102A, 102B. If one of the clients 102A, 102B is an interface used by agents to communicate, the other illustrated client 102A, 102B may be used to apply labels to a target conversation contemporaneous with the target conversation itself. Alternatively, labels may be applied via one of the clients 102A, 102B in stored conversations and used to train the machine learning application 104 offline.

In some embodiments, feature extractor 108 is configured to identify feature values and generate feature vectors from conversation documents. The feature extractor 108 may tokenize words and phrases in a training corpus into vocabulary tokens. The feature extractor 108 may then generate feature vectors that include a sequence of values, with each value representing a different vocabulary token. Examples of feature vectors generated by the feature extractor 108 include, but are not limited to, term frequency feature vectors and term-frequency/inverse document frequency feature vectors. The labels assigned to words and phrases in the training corpus documents may then be associated with corresponding feature vectors.

The feature extractor 108 may append other features to the generated feature vectors. In one example, a feature vector may be represented as $[f_1, f_2, f_3, f_4]$, where $f_1, f_2, f_3$ correspond to tokens and where $f_4$ is a non-vocabulary feature. Example non-vocabulary features may include, but are not limited to, a total duration of a conversation, an elapsed time of conversation or conversation state, among others. The feature extractor 108 may optionally be applied to target conversations to facilitate their analysis.

The ML engine 110 is configured to automatically learn, from the conversation attribute training module 106 and the feature extractor 108, conversational attributes of training corpus conversations. The ML engine 110 is also configured to contemporaneously identify attributes in a new ("target") conversation. The ML engine 110 can then identify one or more desired outcomes for a conversation based on the identified attributes. Desired outcomes identified by the ML engine 110 may then be used by other elements of the ML application 104 to identify one or more phrases, and corresponding confidence levels, that may be used by an agent to accomplish the one or more desired outcomes for the conversation. As indicated above, the desired outcome(s) and any associated phrases may be presented to a user contemporaneously with the conduct of a target conversation.

The ML engine 110 includes, in the example shown, a conversation attribute classifier 112 and a desired outcome generator 114.

The conversation attribute classifier 112 is configured for identifying attributes of target conversations (i.e., contemporaneously analyzed target conversations not in the training corpus). The conversation attribute classifier 112 may receive feature vectors from the feature extractor 108 of conversations in the training corpus that have been analyzed and labeled in the conversation attribute training module 106. The conversation attribute classifier 112 may execute ML training algorithms to build a trained ML model also stored in the conversation attribute classifier 112. A trained ML model may then be used to contemporaneously identify attributes of a target conversation. Example ML training algorithms and ML models include, but are not limited to, supervised learning algorithms (e.g., neural networks).

In some examples, one type of label associated with a conversation in the training corpus may identify a desired outcome of a corresponding conversation. In other examples, additional labels may identify multiple desired outcomes at various stages within a conversation, such as interim desired outcomes that progressively advance a conversation toward an ultimate desired outcome. For example, interim desired outcomes may include establishing rapport with a customer, obtaining further information, identifying price sensitivity, identifying a technical problem, among others. These interim desired outcomes (and their corresponding labels) may be associated with an ultimate desired conversation outcome (and corresponding label) of completing a sale, resolving a technical problem, resolving a complaint, among other similar ultimate outcomes. These examples are provided for illustration purposes only.

The desired outcome generator 114 receives attributes from the conversation attribute classifier 112 for a target conversation, and using the received attributes, generates one or more desired outcomes for the target conversation. As indicated above, this analysis may be executed contemporaneously with the target conversation so that phrases associated with one or more desired outcomes may be presented to a user (i.e., an agent corresponding with a customer).

The desired outcome generator 114 may store multiple desired outcomes that are associated with one or more conversation attributes. In this way, the attributes identified in a target conversation may be used to identify, by association, one or more desired outcomes. In one example, the conversation attribute classifier 112 may identify attributes for a particular conversation or one or more portions of a conversation so that one or more desired outcomes are selected contemporaneously with the conversation.

Desired outcomes may be "interim" desired outcomes that include objectives to accomplish en route to a final disposition of the conversation. This final disposition of the conversation may also be referred to as an "ultimate" desired outcome. Examples of interim desired outcomes may include identifying a problem, identifying a product of interest, identifying a product experiencing a technical issue, among others. Examples of ultimate desired outcomes include completing a sale, resolving a complaint, resolving a technical issue, issuing a replacement product, and the like.

Associations between stored desired outcomes and conversation attributes may be stored in the guidance rules store 116. In one embodiment, a plurality of guidance rules that are stored in the guidance rules store 116 may associate various combinations of keywords, key phrases, elapsed time of a conversation, conversation metadata, caller characteristics, and/or conversation types with one or more desired outcomes of the target conversation. In one embodiment, the guidance rules store 116 stores a plurality of associations between conversation attributes and desired outcomes (conveniently referred to as "guidance rules") that are global to all users of the system 100. These global guidance rules can be formed based on ML training algorithms that use conversation(s) from any user as a training corpus. In another embodiment, the guidance rules store 116 stores guidance rules that are generated (e.g., via an ML training algorithm) based on a particular user (e.g., an agent), product type, or other group. In this case, at least a portion of the training corpus includes conversations specific to the group.

In some cases, a labeled training corpus corresponding to a particular user (i.e., a customer support agent) may also be used in cooperation with a user attribute profile. The user attribute profile may include the industry in which the agent works, the product types or product lines the agent works with, the type of conversations the agent typically engages in (sales, help, product support, complaints), performance metrics associated with call types, behavioral targets, efficiency, productivity, success rate, and others. Using conversations for the training corpus associated with a particular user enables training specific to that user, thus personalizing the analysis and guidance for that particular user. In other examples, a combination of global and user-specific guidance rules can be stored in the guidance rule store 116.

During contemporaneous analysis of a target conversation, the phrase selector 118 may receive a desired outcome from the desired outcome generator 114 and select one or more phrases to present to the user. In various examples, phrases may include complete sentences or partial sentences (e.g., a phrase or clause) that may be spoken to a user or even provided as a autocomplete feature is a text interface between a user (i.e., a customer support agent) and a conversant (i.e., a customer). In one embodiment, the phrase selector 118 may retrieve the phrases from a phrase store 138 within data repository 134. This selection may use, at least in part, labels and/or associations between the phrases and the desired outcomes. In another embodiment, the phrase selector 118 may itself store one or more phrases in association with various desired outcomes.

Once the phrase selector 118 identifies a set of phrases that are associated with one or more desired outcomes provided by the desired outcome generator 114, the identified phrases are presented to the confidence score engine 120.

The confidence score engine 120 includes various subsystems that inter-operate with each other and with other elements of the system 100 to generate confidence scores for the set of phrases presented by the phrase selector 118. The goal of the confidence score engine 120 is to generate confidence scores for phrases in a set of identified phrases, thereby selecting those phrases for use in a conversation that are more likely to advance the conversation to its desired outcome. The confidence score engine 120 includes a caller characteristic monitor 122, a prior conversation data engine 124, a similarity score generator 126, and a confidence score generator 128.

The components of the confidence score engine 120 may collect information from various components throughout the system 100 so as to generate confidence scores for selected phrases. For example, the caller characteristic monitor 122 may retrieve information associated with a customer profile that may affect a confidence score associate with a phrase. A customer profile that indicates a pattern of unresolved issues, frequent returns, frequent complaints, or other similar patterns may lower all confidence scores uniformly, regardless of the phrase and/or desired outcome. Similarly, a customer profile that indicates a pattern of accomplishing a desired outcome in response to a discount, may analogously be a factor that increases confidence scores to phrases offering discounts or other promotions. In other examples, the caller characteristic monitor 122 may identify purchasing patterns, browsing history, shopping cart contents, and other factors that may be used to increase or decrease confidence scores for various phrases.

The prior conversation data engine 124 may access stored conversations (e.g., stored in data repository 134) and identify conversations having a desired outcome similar to the desired outcome of the target conversation. This identification can be accomplished by identifying attributes and/or labels in stored conversations that are shared with the target conversation.

The prior conversation data engine 124 may also analyze a selected subset of stored, prior conversations to identify phrases that were used in these prior conversations to accomplish the desired objective. Once identified, the prior conversation data engine 124 passes the identified stored phrases to the similarity score generator 126. The similarity score generator 126 may then vectorize the phrases and compare these vectors to vectors of the phrases identified by the phrase selector 118. Example comparisons performed by the similarity score generator 126 include generating a similarity score, using for example a cosine similarity function.

The confidence score generator 128 may, in some examples, use the information from the caller characteristic monitor 122, prior conversation data engine 124, and/or similarity score generator 126 to calculate a confidence score for any of the phrases selected by the phrase selector 118. Example confidence scoring algorithms that use this information may include, but are not limited to, statistical hypothesis testing, resampling, regression analysis, along with other similar techniques. In some cases, a confidence score may be based on filtered and/or clustered data in which any of the data provided to the confidence score generator 128 is filtered and/or clustered and the confidence score algorithm executed on a subset of the filtered and/or clustered data.

Frontend interface 130 manages interactions between ML application 104 and clients 102A, 102B. For example, a client may submit requests to perform various functions and view results through frontend interface 130. A client in this context may be a human user, such as a system administrator, or another application, such as a shell or client application. In some examples, a client 102A, 102B is an interface used by an agent to communicate with another party (e.g., a caller or text correspondent).

In some embodiments, frontend interface 130 is a presentation tier in a multitier application. Frontend interface 130 may process requests received from clients, such as clients 102A, 102B, and translate results from other application tiers into a format that may be understood or processed by the clients. Frontend interface 130 may be configured to render user interface elements and receive input via user interface elements. For example, frontend interface 130 may generate webpages and/or other graphical user interface (GUI) objects. Client applications, such as web browsers, may access and render interactive displays in accordance with protocols of the internet protocol (IP) suite. Additionally or alternatively, frontend interface 130 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 132 provides an interface for executing actions using computing resources, such as external resources 140A, 140B. Action interface 132 may include an API, CLI, or other interfaces for invoking functions to execute actions. One or more of these functions may be provided through cloud services or other applications, which may be external to ML application 104. For example, one or more components of system 100 may invoke an API to access a conversation stored in data repository 134 for use as a training document for the machine learning application 104. As another example, an API in the action interface 132 may access communication systems used by agents and callers (or text chat correspondents) so as to execute real-time analysis of the conversations. It will be appreciated considering these examples that the actions that are performed may vary from implementation to implementation.

In some embodiments, external resources 140A, 140B are network services that are external to ML application 104. Example cloud services may include, but are not limited to, social media platforms, email services, short messaging services, enterprise management systems, verbal communication systems (e.g., internet based voice communications, text chat communications, POTS communications systems) and other cloud applications. Action interface 132 may serve as an API endpoint for invoking a cloud service. For example, action interface 132 may generate outbound requests that conform to protocols ingestible by external resources 140A, 140B. Action interface 132 may process and translate inbound requests to allow for further processing by other components of ML engine 110. Action interface 132 may store, negotiate, and/or otherwise manage authentication information for accessing external resources 140A, 140B. Example authentication information may include, but is not limited to, digital certificates, cryptographic keys, usernames, and passwords. Action interface 132 may include authentication information in the requests to invoke functions provided through external resources 140A, 140B.

In some embodiments, ML application 104 is a cloud service, such as a software-as-a-service (SaaS) or a web service. Clients, such as clients 102A, 102B, may be a web browser, mobile application, or other software application communicatively coupled to a network. A client may interact with cloud services using one or more communication protocols, such as HTTP and/or other communication protocols of the Internet Protocol (IP) suite. In other embodiments, ML application 104 may be locally accessible to a user, such as a desktop or other standalone application. In one or more embodiments, the system 100 may include or more data repositories 134. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

A data repository, such as the data repository 134 shown, may be implemented or may execute on the same computing system as the machine learning application 104. The data repository 134 may be communicatively coupled to the machine learning application 104 via a direct connection or via a network.

The example data repository 134 includes two data partitions: agent performance statistics store 136 and conversation phrase store 138. The agent performance statistics store 136 records data associated with the performance of individual agents. For example, data may include high level performance measurements such as a number of conversations conducted during different time periods (e.g., a day, a month, a quarter), a breakdown of the types of calls conducted (e.g., product support, sales, complaint), and a proportion of the conversations that were concluded successfully (e.g., question answered, sale completed, complaint resolved).

The agent performance statistics store 136 may also include more specific performance measurements that may be optionally included in the determination of confidence scores associated with one or more phrases. For example, the agent performance statistics store 136 may store statistics for each agent regarding conversations in which one or more desired outcomes were achieved. Similarly, statistics related to conversations in which a desired outcome was not achieved may also be stored.

Associations between phrases used in conversations, agents using the phrases, and whether or not the desired outcome was achieved may be synthesized and/or generated by various elements of the system 100, as described here.

3.0 Phrase Selection

As indicated above, embodiments described herein may identify at least one desired outcome of a conversation, generate or otherwise identify one or more phrases for accomplishing the desired outcome(s), and determine a corresponding confidence score for the one or more phrases. The confidence scores may describe a likelihood that use of the one or more phrases will accomplish a corresponding desired outcome of the conversation.

These techniques have a number of advantages. First, because of the pace and complexity of normal conversations, it may be difficult for a user (e.g., a call center agent) to identify an appropriate phrase at an appropriate time and to select one phrase from among several candidate phrases that is most likely to advance the conversation toward a desired outcome. The techniques described herein can accomplish these goals, thereby improving the effectiveness of agents and the service provided to customers.

Figure 2:
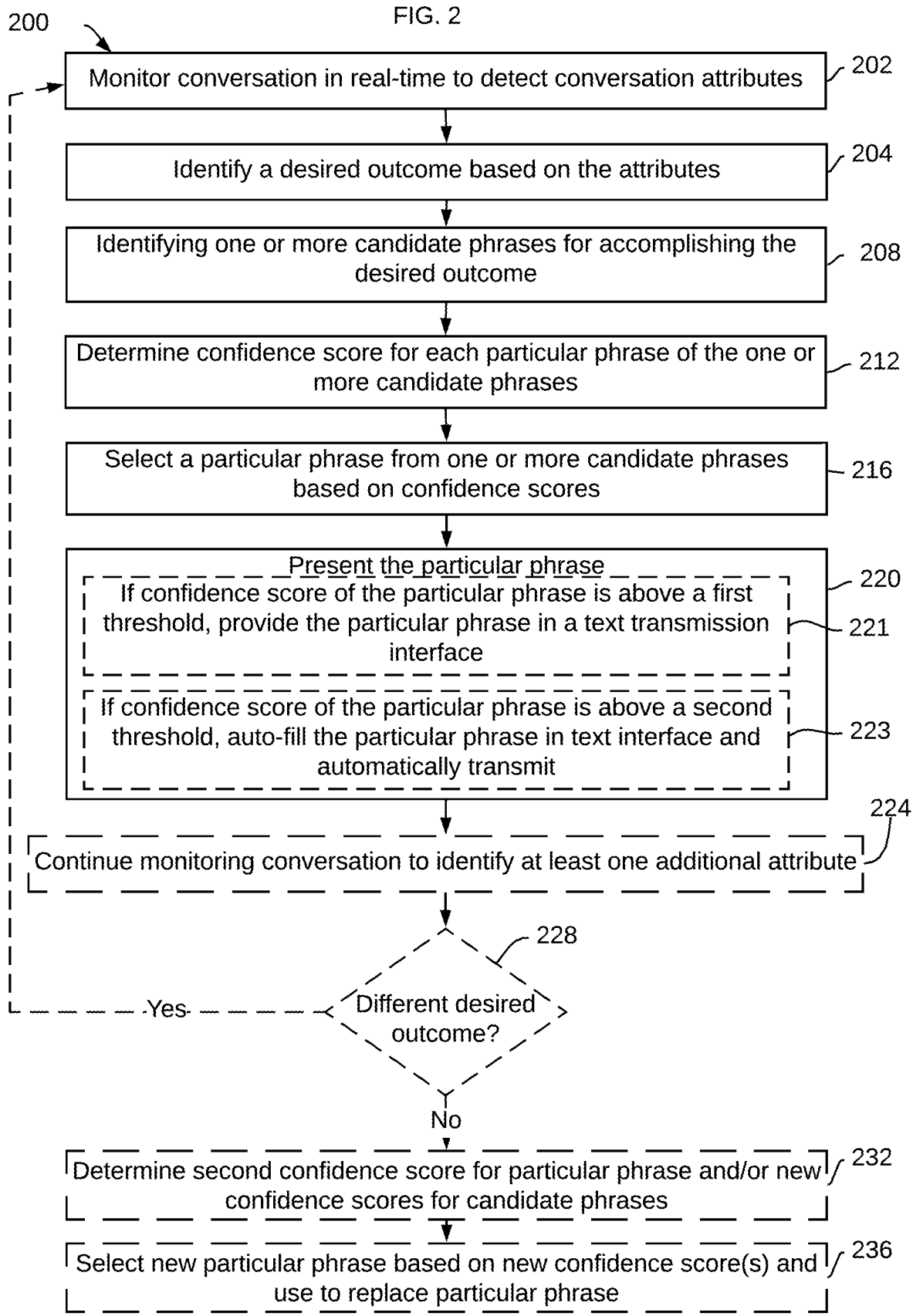
FIG. 2 illustrates example operations for determining a confidence score of one or more phrases that may be used in a conversation for the purpose of accomplishing a desired outcome associated with the conversation, in accordance with some embodiments.

FIG. 2 illustrates an example method 200 by which one or more particular phrases, may be selected using a confidence score and presented to an agent contemporaneously with a target conversation.

The method 200 begins by monitoring a conversation in real-time to detect conversation attributes (operation 202) and using the attributes to identify a desired outcome of the conversation (operation 204). Examples of attributes include phrases, words, time periods, or other aspects of the conversation that can be used to identify ultimate or interim desired outcomes for the conversation. For example, the initiation of a conversation may be an attribute that is associated with an interim desired outcome of establishing rapport between an agent and a caller. In another example, phrases such as "I would like to order," "I have a complaint," "I need help" may indicate a conversation type attribute (e.g., sales, complaint, support) related to a corresponding desired outcome (e.g., close sale, resolve complaint, address technical issue, respectively). Each of these conversation types may in turn be associated with a different (ultimate) desired outcome. Phrases such as "how much does it cost," "that is too expensive," "it still doesn't work" may be conversation attributes associated with interim desired outcomes for further inquiry by the agent.

Conversant characteristics may also be used as attributes for identifying interim and/or ultimate goals. Examples include demographic characteristics of a conversant (e.g., age, income bracket, geographic location, family configuration), browsing history (e.g., products or information pages viewed on a website or mobile application), product engagement history (e.g., products placed in a website shopping cart). These attributes may also be used to identify desired outcomes of a conversation. For example, if products have been placed in a shopping cart, this attribute may be used to generate a desired outcome of completing the sale of those products. If product help forums or pages have been viewed by the conversant, this attribute generate a desired outcome of resolving a product support issue.

The system may identify one or more phrases for accomplishing the desired outcome identified based on the conversation attributes (operation 208). As described above, phrases may be identified for interim desired outcomes and/or ultimate desired outcomes. The phrases may include words, clauses (e.g., several words not forming a complete sentence), or complete sentences.

The system may identify candidate phrases using one or more of the desired outcome(s) and/or the conversation attribute(s). For example, a desired outcome and optionally one or more attributes identified in Operations 202 and 204 may be used to contemporaneously identify one or more stored phrases that may advance the conversation toward the desired outcome. This identification may be based on metadata (e.g., labels, desired outcomes, attributes) stored in association with one or more of the phrases. The system may search this metadata of the stored phrases using the desired outcome and/or attributes identified in the target conversation.

Figure 3:
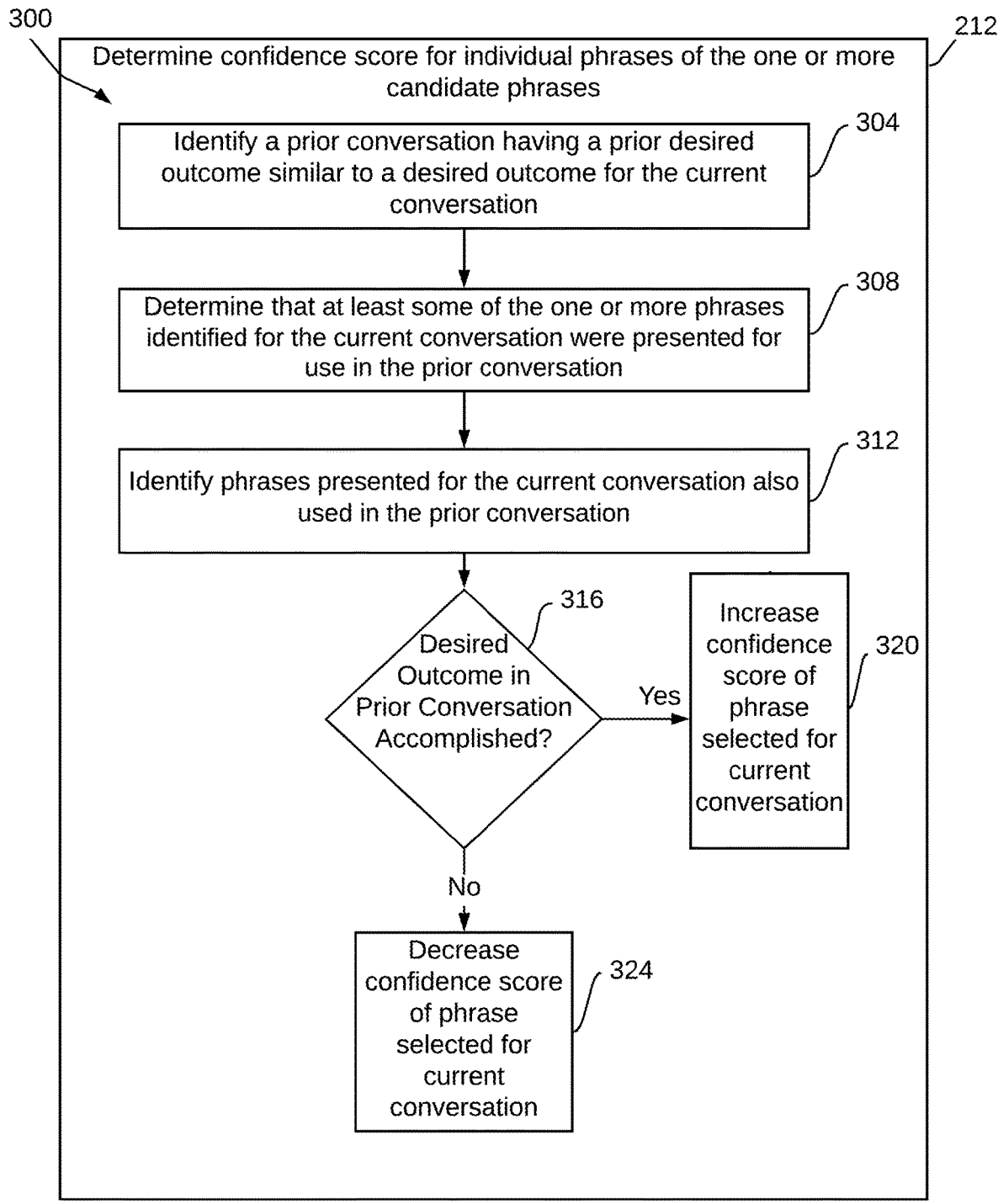
FIG. 3 illustrates example operations for determining a confidence score of one or more phrases using data recorded in prior conversations in which the one or more phrases were previously used, in accordance with some embodiments.
Figure 4:
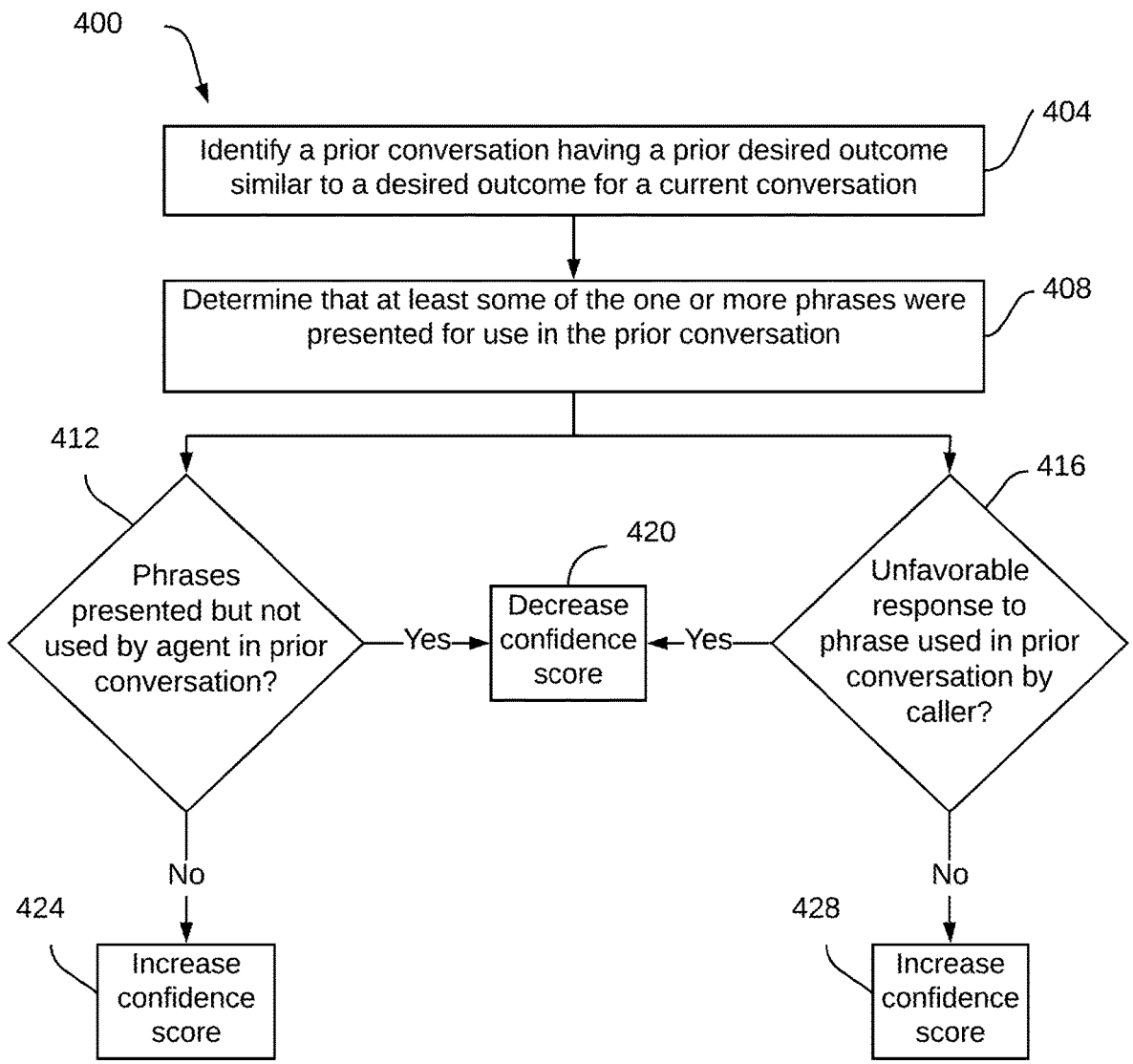
FIG. 4 illustrates example operations for determining a confidence score of one or more phrases using data recorded in prior conversations in which the one or more phrases were previously used, in accordance with some embodiments.

The system may evaluate each of the one or more identified candidate phrases for its likely effectiveness in advancing the conversation toward the desired outcome (operation 212). This likelihood may be captured by determining confidence scores corresponding to each of the identified one or more candidate phrases. At a high level, a confidence score can at least in part be based on an analysis of prior conversations having a similar desired outcome. Once these prior conversations have been identified, phrases used in the prior conversations and whether or not the previously used phrases resulted in the desired outcome being accomplished can be used as part of the determination of confidence scores. FIGS. 3, 4, and 5, described below, include more detailed techniques for the determination of confidence scores.

The confidence scores may be used to select a particular phrase from among the set of candidate phrases (operation 216). In some examples, the particular phrase may be selected based on a ranking of confidence scores corresponding to the one or more identified candidate phrases. The particular phrase may be selected by simply selecting the highest confidence score. In other examples, the particular phrase may be selected based on a combination of one or more of the confidence score, a similarity score between desired outcomes of the present conversation and previous conversations, and a similarity score between current phrases and phrases used in previous conversations.

The system may then present the particular selected phrase to the agent (operation 220). For example, the system may present the phrase as a complete sentence, a clause, a word or some other representation of the particular phrase. The system may present the particular phrase to the user either aurally (e.g., machine generated speech) or visually. In some examples, the system presents the particular phrase to the user as an engageable object in a text chat interface that the user may simply select to transmit to a conversant. In other examples, the system may present the particular phrase as a clause (or sentence or word(s)) in a text chat interface as an "autocomplete" or "auto-fill" option for a response that the user has already started typing. In one embodiment, the phrase may be auto-filled in a user interface (e.g., a text interface for a text chat session) if the confidence score is above a first threshold (operation 221). For example, if the first threshold indicates that the phrase is more likely than not to accomplish the desired outcome or is simply has the highest confidence score of the various candidate phrases, the system may simply populate the text chat window (or more generally, text transmission interface)

with the phrase. In another embodiment, an auto-filled phrase may be automatically sent to a recipient if the confidence score of the phrase is above a second threshold greater than the first threshold (operation 223). This second threshold indicates an even higher level of confidence that the phrase will accomplish the desired outcome of the conversation. In still other examples, the system may present the particular phrase on a display that the user reads to a conversant. It will be appreciated that other similar user interface schemes may be used to present the selected phrase to the user.

The system may optionally repeat this process to update a presented phrase as new attributes are detected in the contemporaneously monitored conversation. For example, the system may continue monitoring the conversation and thereby identify at least one additional attribute in the conversation (operation 224). If the system detects new attributes, the desired outcome may be updated and the selection process for a particular phrase can be repeated (operation 228). For example, an interim desired outcome (e.g., understand technical problem) may be completed and recognized as completed (e.g., an agent stating "The problem we need to solve is ... "). This interim desired outcome can then be replaced by another interim desired outcome or an ultimate desired outcome (e.g., resolve technical issue).

In another variation, the desired outcome may not be changed upon detection of a new attribute (operation 228). However, because new attributes have been detected, the system may determine a second confidence score for the particular phrase that incorporates the new attributes. In another embodiment, the system may determine new confidence scores for all of the candidate phrases, and re-rank them according to the new confidence scores (operation 232). Regardless of whether only the confidence score of the particular phrase is updated, or all confidence scores for the candidate phrases are updated, a new particular phrase may be selected based on the new confidence score(s) (operation 236). This newly selected phrase may replace the prior particular phrase.

4.0 Confidence Score Generation

FIGS. 3, 4 and 5 illustrate various example techniques by which the system may generate confidence scores. As described below, confidence scores may be based in part on observations made in prior, similar conversations. For example, a confidence score determined according to the method shown in FIG. 3 may be based (at least in part) on whether a desired outcome in a prior conversation, similar to the desired outcome in a target conversation, was actually accomplished. A confidence score determined according to the method shown in FIG. 4 may be based (at least in part) on whether an agent actually used a presented phrase or whether, if used, the customers response was unfavorable. A confidence score determined according to the method shown in FIG. 5 may be based (at least in part) on rates of completion of desired outcomes in prior conversations and/or similarity scores between phrases used in previous conversations relative to the target conversation.

Turning first to FIG. 3, an example method 300 for determining a confidence score is shown. This example process begins by identifying a prior conversation having a desired outcome similar to the desired outcome for the current (target) conversation (operation 304). Identifying similar desired outcomes may be accomplished by comparing a vector of the target conversation to vectors generated from prior, stored conversations. The vectors (of both the target and prior conversations) can be generated by tokenizing a transcript or another recording of the target conversation and the prior conversations. The system may then apply natural language processing algorithms to the tokenized conversations to generate corresponding feature vectors. The system may identify prior conversations relevant to the target conversation by comparing analogous vector elements of the target conversation to those of prior conversations. For example, the system may use similarity scores (e.g., generated by cosine similarity functions) between prior conversation vectors and the target conversation vector to identify prior conversations that are relevant to the analysis. In other examples, only the vector elements corresponding to the desired outcome are compared.

Having identified prior conversations with a similar desired outcome to the target conversation, phrases used in the prior conversation are identified in the stored versions of the prior conversations (operation 308). These previously used phrases are then compared to the phrases identified for use in the current conversation, again by comparing vectors corresponding to the phrases using a similarity score, such as cosine similarity.

Based on this similarity analysis, the system identifies phrases selected for the current conversation that were also used in a prior conversation (operation 312). This identification may be accomplished by selecting those phrases presented for the current conversation having a similarity score above a threshold relative to previously presented phrases.

The system may then determine whether the prior conversations in which the similar, prior phrases were used were successful in accomplishing a corresponding desired outcome (operation 316). The system may determine this information by comparing the desired outcome to the actual outcome in the stored representation of the prior conversation. For example, a conversation selected according to the above criteria can be analyzed to determine whether a sale was completed, a technical support issue resolved, or a complaint addressed by referring to data stored with the conversation or vector corresponding to the stored conversation data. In some examples, whether a desired outcome is accomplished is stored in conversation data as a response to a question from an agent to a conversant as "did I resolve your concern today?" or analogous question.

The system may increase confidence scores for a first subset of phrases identified for the target conversation that are similar to those used (1) in a prior conversation in which (2) the desired outcome was accomplished (operation 320). Similarly, the system may decrease confidence scores for a second subset of phrases identified for the target conversation that are similar to those used (1) in a prior conversation in which (2) the desired outcome was not accomplished (operation 324).

In a variation of the process shown in FIG. 300, the system may monitor many conversations concurrently and in real-time during a first time period to determine a rate at which a first desired outcome has been achieved after a first phrase is used in one or more of the conversations. A second conversation, separate from the conversations monitored during the first time period, may also be monitored to determine its corresponding second desired outcome (identified based on one or more corresponding attributes). In this scenario, similar to some of the scenarios presented above, the second desired outcome may be identical to the first desired outcome. Based on the rate at which the system detects the first desired outcome being achieved from usage of the first phrase, the first phrase can be recommended for use in the second conversation so that the second desired outcome in this second conversation may be accomplished. For example, if the rate at which the first desired outcome is achieved is greater than 50% or greater than 75% in conversation using the first phrase, then the first phrase may be recommended for use in the second conversation. In another example, the decision to use or not use the first phrase may be determined based on relative success. For example, if the first phrase is more successful than other phrases used (whether by a few percent or by hundreds of percent), then the first phrase may be recommended to be used in the second conversation. Based on this recommendation, the first phrase may be provided for use in the second conversation.

The first period of time during which the many conversations are monitored may precede a time period associated with the second conversation. In some embodiments, a threshold may be set that permits the first time period to overlap with the second conversation. In other examples, this threshold may be set so that the time periods do not overlap (e.g., by a day, a week, a month). The start of the first period of time may precede the second conversation by less than a second (maximum) threshold period of time. This second threshold may be selected to preserve relevance of the conversations in the first time period to the second conversation. For example, the second threshold may be set so that conversations remain relevant to the second conversation in a social context. For example, the second threshold may be set so that the earliest conversations within the first time period have taken place a maximum of a week, a month, a calendar quarter, or a year before the second conversation. In other examples, the maximum threshold may be set based on publicized events, such as the occurrence of seasonal changes, natural disasters, religious or public holidays, the start and/or end of academic years, and the like.

FIG. 4 illustrates an example method 400 in which confidence scores for phrases presented for a target conversation are adjusted based on an inferred response by an agent and/or a conversant to a similar phrase used in a prior conversation. The method 400 begins by identifying a prior conversation (or multiple prior conversations) having a desired outcome similar to the desired outcome for the current conversation (operation 404). This identification can be accomplished using natural language processing, feature vectors, and similarity scores, as described above.

The system may then determine that some of the phrases identified and/or presented for the current conversation were also used in the prior conversation, again using natural language processing, feature vectors, and similarity scores (operation 408).

The system may then identify reactions to phrases presented in prior conversations by one or both of the agent and the correspondent. For example, if a phrase presented for the current conversation was also presented to an agent in a prior conversation, but not used (operation 412), the system may infer that the agent determined that its use would not be helpful. In this case, the confidence score for use of that phrase (or similar phrase) in the current conversation may be decreased (operation 420). If the phrase was used by an agent in the prior conversation, the confidence score may be increased or not decreased (operation 424).

Similarly, the system may determine whether a previously supplied and used phrase received an unfavorable response from the conversant (operation 416). Examples of unfavorable responses include lengthy silences, abrupt terminations of the conversation, or express negative statements (e.g., "no," "that won't work," "not interested"). Unfavorable responses to a phrase in a prior conversation may be used to decrease a confidence score for a similar phrase for the current conversation (operation 420). The lack of an unfavorable response may increase, or not decrease, a confidence score for a similar phrase identified in the current conversation.

FIG. 5 illustrates an example method 500 in which confidence scores for phrases presented for a target conversation are adjusted based on rates of completion of desired outcomes in prior conversations and/or similarity scores between phrases used in previous conversations relative to the target conversation. Similar to the example methods 300 and 400, the example method 500 begins by identifying a prior conversation (or multiple prior conversations) having a desired outcome similar to the desired outcome for the current conversation (operation 504) using natural language processing, feature vectors, and similarity scores, as described above. The system determines that at least some of the phrases presented for use in the current conversation were used in the prior conversations having similar desired outcomes (operation 508).

In one variation of the method 500, the system can determine a rate at which desired outcomes were achieved in conversations using phrases similar to those identified for the current conversation (operation 512). In one example, the confidence scores associated with phrases for the current conversation can be adjusted in proportion to, or as a function of, the completion rate of the prior conversations. For example, a completion rate of 10% of prior conversations may be used to scale a confidence score, calculated using some or all of the techniques described above, by a factor of 0.1. A completion rate of 100% of prior conversations may be used to scale a confidence score by a factor of 1 (i.e., no change) or 2 (doubling the confidence score arrived at by other means).

In another variation of the method 500, a confidence score of a phrase identified for the current conversation may be scaled or adjusted based on a similarity score with phrases used in prior conversations. This technique may optionally be combined with operations 512 and 516, so that phrases associated with a high rate of accomplishing a desired outcome that have a high similarity score with phrases identified for the present conversation are increased. Phrases identified for the current conversation that are dissimilar to previously used phrases may have their confidence scores decrease, reflecting the lack of information.

It will be appreciated that any of the methods 300, 400, and 500 may be combined in any combination with the method 200.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
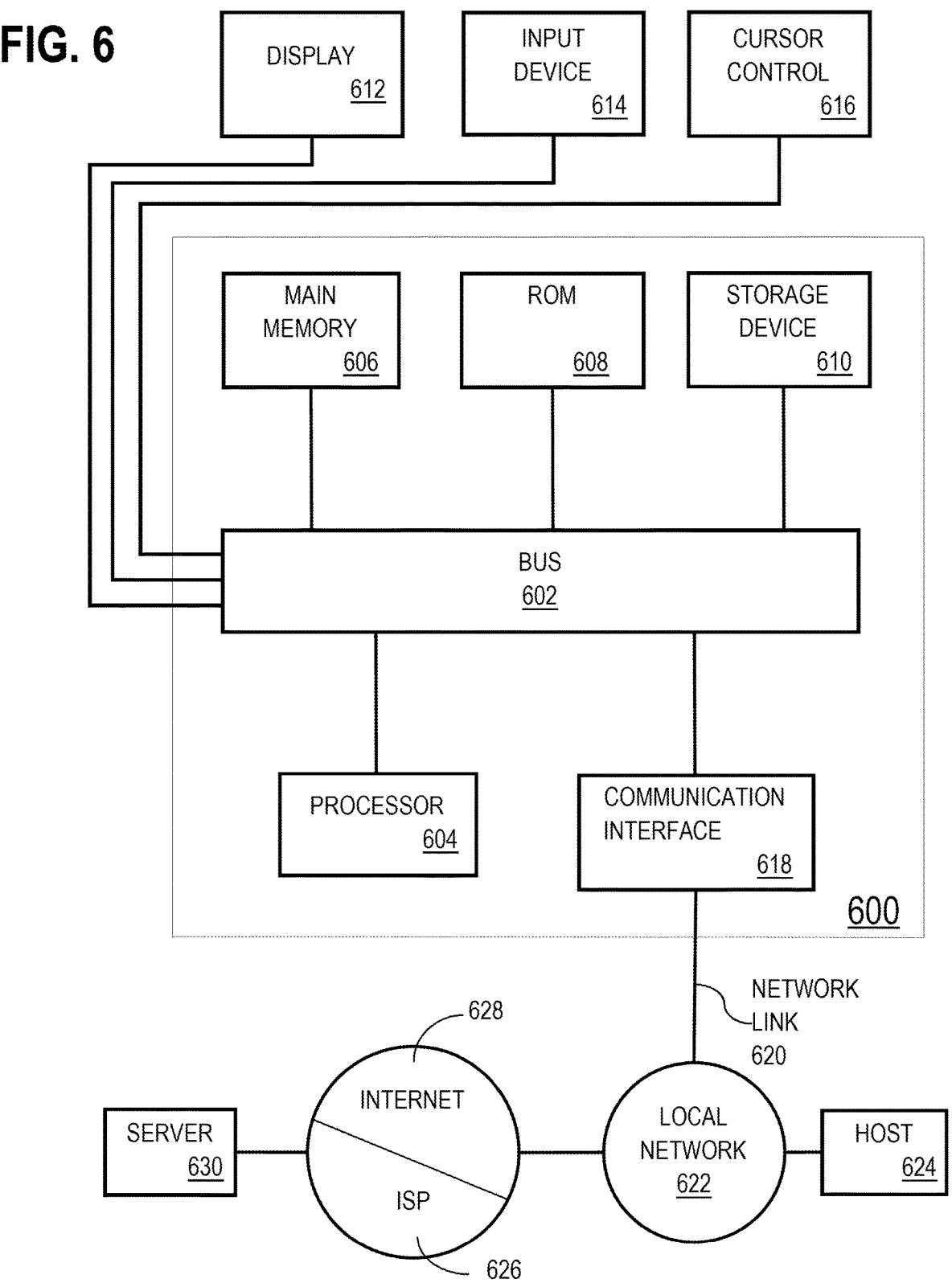
FIG. 6 shows a block diagram that illustrates a computer system in accordance with one or more embodiments.

For example, FIG. 6 is a block diagram that illustrates computer system 600 upon which some embodiments may be implemented. Computer system 600 includes bus 602 or other communication mechanism for communicating information, and a hardware processor 604 coupled with bus 602 for processing information. Hardware processor 604 may be, for example, a general purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622.

For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
training a machine learning model to identify a phrase for use in a conversation at least by:
obtaining training data sets, each training data set comprising:
a set of prior conversations;
a set of phrases used in at least one prior conversation of the set of prior conversations;
a set of prior desired outcomes corresponding to the prior conversations of the set of prior conversations;
a set of rates at which the prior desired outcomes of the prior conversations were accomplished;
training the machine learning model based on the training data sets;
monitoring a conversation in real-time to detect one or more attributes of the conversation;
identifying a set of one or more candidate phrases for accomplishing a desired outcome of the conversation;
applying the trained machine model to select a particular phrase from the set of one or more candidate phrases, the particular phrase associated with an increased likelihood of accomplishing the desired outcome of the conversation;
presenting the particular phrase for use in the conversation;
updating the training data sets by:
identifying a first start date and a first end date between which the set of prior conversations occurred;
identifying (a) a second start date between the first start date and the first end date and (b) a second end date after the first end date;
selecting an updated set of prior conversations that occurred between the second start date and the second end date; and
retraining the trained machine learning model with the updated set of prior conversations.

2. One or more non-transitory computer-readable media storing instructions, which when executed by one or more hardware processors, cause performance of operations comprising:
training a machine learning model to identify a phrase for use in a conversation at least by:
obtaining training data sets, each training data set comprising:
a set of prior conversations;
a set of phrases used in at least one prior conversation of the set of prior conversations;
a set of prior desired outcomes corresponding to the prior conversations of the set of prior conversations;
a set of rates at which the prior desired outcomes of the prior conversations were accomplished;
training the machine learning model based on the training data sets;
monitoring a conversation in real-time to detect one or more attributes of the conversation;
identifying a set of one or more candidate phrases for accomplishing a desired outcome of the conversation;
applying the trained machine model to select a particular phrase from the set of one or more candidate phrases, the particular phrase associated with an increased likelihood of accomplishing the desired outcome of the conversation;
presenting the particular phrase for use in the conversation;
monitoring the conversation after providing the particular phrase, the monitoring identifying at least one additional attribute of the conversation;
responsive to the at least one additional attribute, re-applying the trained machine learning model;
based on the re-application of the trained machine learning model, selecting a second phrase from the set of one or more candidate phrases to be provided for use in the conversation; and wherein the particular phrase is de-selected and replaced by the second phrase, the second phrase being provided for use in the conversation instead of the particular phrase.

3. One or more non-transitory computer-readable media storing instructions, which when executed by one or more hardware processors, cause performance of operations comprising:
- training a machine learning model to identify a phrase for use in a conversation at least by:
  - obtaining training data sets, each training data set comprising:
    - a set of prior conversations;
    - a set of phrases used in at least one prior conversation of the set of prior conversations;
    - a set of prior desired outcomes corresponding to the prior conversations of the set of prior conversations;
    - a set of rates at which the prior desired outcomes of the prior conversations were accomplished;
  - training the machine learning model based on the training data sets;
- monitoring a conversation in real-time to detect one or more attributes of the conversation;
- identifying a set of one or more candidate phrases for accomplishing a desired outcome of the conversation;
- applying the trained machine model to select a particular phrase from the set of one or more candidate phrases, the particular phrase associated with an increased likelihood of accomplishing the desired outcome of the conversation;
- presenting the particular phrase for use in the conversation;
- wherein the set of phrases used in the at least one prior conversation of the set of prior conversations in the training data sets are associated with:
  - at least one prior desired outcome of the set of prior desired outcomes;
  - a corresponding label indicating whether the prior desired outcome was accomplished or not accomplished;
- wherein the applying operation comprises refraining from selecting a phrase associated with the label indicating the prior desired outcome was not accomplished as the particular phrase;
- the set of phrases used in the at least one prior conversation of the set of prior conversations are associated with a label indicating whether a response to the phrases of the set of phrases was an adverse response; and
- the applying operation comprises refraining from selecting a phrase associated with the adverse response as the particular phrase.

4. The non-transitory computer-readable media of claim 1, wherein:
- each training data set further comprises a set of characteristics associated with prior participants in the one or more corresponding prior conversations; and
- applying the trained machine learning model further comprises selecting the particular phrase based, at least in part, on a set of target characteristics associated with a present participant in the conversation.

5. The non-transitory computer-readable media of claim 4, wherein the characteristics of the set of characteristics associated with the prior participants in one or more corresponding prior conversations comprise one or more of demographic information, a browsing history, and a product engagement history.

6. The non-transitory computer-readable media of claim 1, wherein presenting the particular phrase for use in the conversation comprises presenting the particular phrase in a text transmission interface.

7. The non-transitory computer-readable media of claim 1, further comprising identifying the desired outcome of the conversation based on the one or more attributes of the conversation.

8. A method comprising:
- training a machine learning model to identify a phrase for use in a conversation at least by:
  - obtaining training data sets, each training data set comprising:
    - a set of prior conversations;
    - a set of phrases used in at least one prior conversation of the set of prior conversations;
    - a set of prior desired outcomes corresponding to the prior conversations of the set of prior conversations;
    - a set of rates at which the prior desired outcomes of the prior conversations were accomplished;
  - training the machine learning model based on the training data sets;
- monitoring a conversation in real-time to detect one or more attributes of the conversation;
- identifying a set of one or more candidate phrases for accomplishing a desired outcome of the conversation;
- applying the trained machine model to select a particular phrase from the set of one or more candidate phrases, the particular phrase associated with an increased likelihood of accomplishing the desired outcome of the conversation;
- presenting the particular phrase for use in the conversation;
- updating the training data sets by:
- identifying a first start date and a first end date between which the set of prior conversations occurred;
- identifying (a) a second start date between the first start date and the first end date and (b) a second end date after the first end date;
- selecting an updated set of prior conversations that occurred between the second start date and the second end date; and
- retraining the trained machine learning model with the updated set of prior conversations.

9. A method comprising:
- training a machine learning model to identify a phrase for use in a conversation at least by:
  - obtaining training data sets, each training data set comprising:
    - a set of prior conversations;
    - a set of phrases used in at least one prior conversation of the set of prior conversations;
    - a set of prior desired outcomes corresponding to the prior conversations of the set of prior conversations;
    - a set of rates at which the prior desired outcomes of the prior conversations were accomplished;
  - training the machine learning model based on the training data sets;
- monitoring a conversation in real-time to detect one or more attributes of the conversation;
- identifying a set of one or more candidate phrases for accomplishing a desired outcome of the conversation;
- applying the trained machine learning model to select a particular phrase from the set of one or more candidate phrases, the particular phrase associated with an increased likelihood of accomplishing the desired outcome of the conversation;
- presenting the particular phrase for use in the conversation;
- monitoring the conversation after providing the particular phrase, the monitoring identifying at least one additional attribute of the conversation;
- responsive to the at least one additional attribute, re-applying the trained machine learning model; and based on the re-application of the trained machine learning model, selecting a second phrase from the set of one or more candidate phrases to be provided for use in the conversation; and wherein the particular phrase is de-selected and replaced by the second phrase, the second phrase being provided for use in the conversation instead of the particular phrase.

10. A method comprising:

training a machine learning model to identify a phrase for use in a conversation at least by:

obtaining training data sets, each training data set comprising:
- a set of prior conversations;
- a set of phrases used in at least one prior conversation of the set of prior conversations;
- a set of prior desired outcomes corresponding to the prior conversations of the set of prior conversations;
- a set of rates at which the prior desired outcomes of the prior conversations were accomplished;

training the machine learning model based on the training data sets;

monitoring a conversation in real-time to detect one or more attributes of the conversation;

identifying a set of one or more candidate phrases for accomplishing a desired outcome of the conversation;

applying the trained machine model to select a particular phrase from the set of one or more candidate phrases, the particular phrase associated with an increased likelihood of accomplishing the desired outcome of the conversation;

presenting the particular phrase for use in the conversation;

wherein the set of phrases used in the at least one prior conversation of the set of prior conversations in the training data sets are associated with:
- at least one prior desired outcome of the set of prior desired outcomes;
- a corresponding label indicating whether the prior desired outcome was accomplished or not accomplished; and
- wherein the applying operation comprises refraining from selecting a phrase associated with the label indicating the prior desired outcome was not accomplished as the particular phrase;

the set of phrases used in the at least one prior conversation of the set of prior conversations are associated with a label indicating whether a response to the phrases of the set of phrases was an adverse response; and the applying operation comprises refraining from selecting a phrase associated with the adverse response as the particular phrase.

11. The method of claim 8, wherein:

each training data set further comprises a set of characteristics associated with prior participants in the one or more corresponding prior conversations; and applying the trained machine learning model further comprises selecting the particular phrase based, at least in part, on a set of target characteristics associated with a present participant in the conversation.

12. The method of claim 11, wherein the characteristics of the set of characteristics associated with the prior participants in one or more corresponding prior conversations comprise one or more of demographic information, a browsing history, and a product engagement history.

13. The method of claim 8, wherein presenting the particular phrase for use in the conversation comprises presenting the particular phrase in a text transmission interface.

14. The method of claim 8, further comprising identifying the desired outcome of the conversation based on the one or more attributes of the conversation.

* * * * *